UNITED STATES PATENT OFFICE 2,581,388

HYDROXY ACID ESTERS OF OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application April 22, 1949,
Serial No. 89,139

8 Claims. (Cl. 260—52)

The present invention is concerned with certain new chemical products, compounds, or compositions which have useful application in various arts. This application is a continuation-in-part of our co-pending application Serial No. 751,616, filed May 31, 1947 and now abandoned. It includes methods or procedures for manufacturing said new chemical products, compounds, or compositions, as well as the products, compounds, or compositions themselves.

Said new compositions are esters of a hydroxylated monocarboxy acid having less than 8 carbon atoms, and hydrophile hydroxylated synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive toward said phenol; said resin being formed in the substantial absence of trifunctional phenols; said phenol being of the formula:

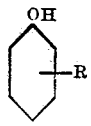

in which R is a hydrocarbon radical having at least 4 and not more than 12 carbon atoms and substituted in the 2,4,6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our co-pending application Serial No. 89,138, filed April 22, 1949, now Patent 2,542,007, granted February 20, 1951. See also our co-pending application Serial No. 64,469, filed December 8, 1948.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

The oxylkylated resins, used to provide the alcoholic radical of the new esters, are described in our Patents 2,499,370, granted March 7, 1950, and 2,542,007, granted February 20, 1951, and reference is made to these patents for a description of phenol-aldehyde resins to produce the alcoholic products. For specific examples of the resins, reference is made to Examples 1a through 103a of Patent 2,499,370. For examples of oxyalkylated products derived from these resins, reference is made to the tables at columns 31 through 46 of Patent 2,542,007.

The hydroxylated monocarboxy acids employed to furnish the acyl radical are characterized by the fact that they contain less than 8 carbon atoms. Such acids include, among others, glycollic acid (hydroxyacetic acid), lactic acid, and hydroxybutyric acid, as well as polymers thereof. For instance, in the case of glycollic (hydroxyacetic acid), one may have a dimer and trimer, such as

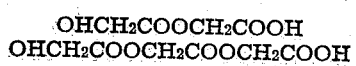

Similar polymers of lactic acid or other hydroxy acids having a total of less than 8 carbon atoms, are also known and suitable for the present purpose. Our preference, however, is to use hydroxyacetic acid, for the reason that it is cheap and readily available in anhydrous form, or at least, in a form which represents a maximum concentration.

Having prepared or purchased suitable oxalkylated derivatives to be used as alcoholic reactants, one can purchase or prepare hydroxylated monocarboxy acids characterized by the fact that the acyl radical contains less than 8 carbon atoms. Note what has been said previously with regard to these particular acidic reactants. One need not use the acid as such, but any other obvious equivalent may be employed, such as the acylchloride, the anhydride, an ester, particularly a low molal ester which can be employed in the re-esterification process, or alcoholysis reaction, with the elimination of a low molal alcohol, such as methyl alcohol or ethyl alcohol.

*Example 1c*

An oxyalkylated derivative, such as Example 104b of Patent 2,542,007, was esterified with hydroxyacetic acid in an amount sufficient to convert approximately one-fourth of the polyglycol radicals into the low molal carboxy acid ester. The hydroxyl value of the oxyalkylated derivative can be calculated without determination, based on the hydroxyl value and weight of the phenol-aldehyde resin originally employed, plus the increase in weight after oxyalkylation. If glycide or methylglycide are employed, allowance must be made for the polyhydric character of the oxyalkylating reactant. In any event, if desired, the hydroxyl value of the oxyalkylated product can be determined by the Verley-Bölsing method, or any other acceptable procedure. The esterification reaction is conducted in any conventional manner, such as that employed for the preparation of the low molal carboxy acid esters of phenoxyethanol. If desired, esterification can be conducted in the presence of xylene, or even a higher boiling solvent, such as mesitylene, cymene, tetralin or the like. It is not necessary to add all of the acetic acid at one time. One may add a quarter or half the total amount to be esterified, and after such portion of the reactant has combined, then add more of the acid. The solubility of the acetic acid, of course, increases as the hydroxyl radical is replaced by an ester radical.

Our preference is to have present a substantial amount of xylene or higher boiling water-insoluble solvent and to distil under a reflux condenser arrangement so that the water resulting from esterification is volatilized and condensed along with the xylene vapor in a suitably arranged trap. The amount of xylene employed is approximately equal to one-half the weight of the mixed reactants. The water should be removed from the trap either manually or automatically and the xylene returned continuously for further distillation. Such reaction is hastened if a small amount of dry hydrochloric acid gas is continuously injected into the esterification mixture. When the reaction is completed, the xylene is removed by distillation. Small amounts of unreacted low molal hydroxy carboxy acids can be converted into the methyl or ethyl ester and removed by vacuum distillation, or permitted to remain. For example, an excess of anhydrous ethyl alcohol may be added and reacted so as to esterify any residual acid, and then such excess of ethyl alcohol can be distilled off as 95% alcohol-5% of water mixture, and thus the water resulting from esterification with the alcohol can be removed. We find that such precaution, however, is usually unnecessary. This applies even when the amount of hydroxy carboxy acid employed is stoichiometrically equal to the hydroxyl value. In a number of cases we prefer to prepare a partial ester in which there is present residual hydroxyl radicals. Under such circumstances there are substantially no free hydroxy carboxy acid radicals present and the products obtained by partial esterification, instead of complete esterification, represent a particularly valuable type. A sulfonic acid, such as toluene sulfonic acid, may be added in amounts of one-half to one per cent to act as a catalyst.

As a specific example, 900 grams of xylene-containing oxyalkylated resin 121b were reacted with 23 grams of hydroxyacetic acid in the presence of 300 grams of additional xylene and 20 grams of paratoluene sulfonic acid for 4.5 hours at 143° C. 4.5 grams of water were eliminated.

*Example 2c*

The same procedure was followed as in Example 1c, preceding, except that the amount of hydroxyacetic acid employed was sufficient to convert one-half of the polyglycol radicals into ester form.

As a specific example, the same procedure was followed as in Example 1c, preceding, but 854 grams of xylene-containing oxyalkylated resin 116b of Patent 2,542,007 were used in conjunction with 46 grams of hydroxyacetic acid. 9.1 grams of water were evolved.

*Example 3c*

The same procedure was followed as in Example 1c, preceding, except that the amount of hydroxyacetic acid employed was sufficient to convert three-fourths of the polyglycol radicals into ester form.

As a specific example, the same procedure was followed as in Example 1c, preceding, except that 776 grams of xylene-containing oxyalkylated resin 106b of Patent 2,542,007 were reacted with 69 grams of hydroxyacetic acid until 14.5 grams of water were evolved.

*Example 4c*

The same procedure was followed as in Example 1c, preceding, except that the amount of hydroxyacetic acid employed was sufficient to convert substantially all of the polyglycol radicals into ester form.

As a specific example, the same procedure was followed as in Example 1c, preceding, except that 994 grams of xylene-containing oxyalkylated resin 107b of Patent 2,542,007 were reacted with 92 grams of hydroxyacetic acid until 18 grams of water were evolved.

In the following examples the same procedure was used and the data are presented in tabular form. The first column indicates the example number; the second column indicates the number of the xylene-containing oxyalkylated resin; the third column indicates in grams the xylene present in the resin solution; the fourth column indicates the low molal hydroxylated carboxy acid employed; the fifth column indicates the weight in grams of the acylating agent; the sixth column indicates the time in hours after reaching maximum temperature to cause reaction to go to the indicated stage of completion; the seventh column is the maximum temperature of reaction in degrees centigrade; and the eighth column indicates the amount of water evolved. In each of the experiments indicated in the following table the amount of xylene-containing oxyalkylated resin employed was 300 grams. In each case there were 200 grams of additional xylene included in the reflux mixture, along with 20 grams of para-toluene sulfonic acid.

the minimum requirement for the oxyalkylated resin, as defined.

| Ex. No. | Xylene Containing Oxyalkylated Resin Ex. No. of Patent 2,542,007 | Xylene in Resin | Acylating Agent Used | Weight in Grams of Acylating Agent | Time, Hours after Reaching Max-Temp. | Max-Temp. of Reaction, °C. | Water Evolved |
|---|---|---|---|---|---|---|---|
|  |  | Grams |  |  |  |  | Grams |
| 5c | 106b | 61.5 | Glycollic | 76.0 | 6.5 | 138 | 9.8 |
| 6c | 107b | 47.8 | ----do---- | 22.9 | 6.5 | 141 | 6.6 |
| 7c | 108b | 37.5 | ----do---- | 18.9 | 6.0 | 138 | 5.9 |
| 8c | 128b | 59.7 | ----do---- | 30.4 | 5.0 | 140 | 10.2 |
| 9c | 116b | 89.2 | ----do---- | 24.3 | 4.5 | 139 | 8.5 |
| 10c | 111b | 77.4 | ----do---- | 25.1 | 2.5 | 141 | 10.3 |
| 11c | 122b | 71.3 | ----do---- | 19.2 | 2.8 | 140 | 5.0 |
| 12c | 133b | 44.7 | ----do---- | 16.8 | 2.0 | 141 | 5.9 |
| 13c | 136b | 50.0 | Hydroxyacetic | 27.8 | 4.5 | 142 | 9.0 |
| 14c | 106b | 61.6 | Lactic | 40.9 | 6.5 | 139 | 5.1 |
| 15c | 127b | 46.2 | ----do---- | 27.9 | 6.0 | 143 | 9.7 |
| 16c | 116b | 89.2 | Lactic 85% | 28.0 | 4.3 | 142 | 10.8 |
| 17c | 112b | 62.5 | ----do---- | 28.1 | 5.5 | 139 | 8.6 |
| 18c | 121b | 71.5 | ----do---- | 35.3 | 5.1 | 142 | 14.1 |
| 19c | 131b | 51.6 | ----do---- | 37.0 | 2.8 | 145 | 13.4 |
| 20c | 137b | 50.0 | ----do---- | 21.4 | 5.0 | 143 | 7.7 |

Attention is directed to the following fact: The oxyalkylated resins herein used as intermediate materials for further reaction to provide more complex derivatives are characterized by having certain minimum hydrophile properties, as described, and it is particularly desirable that these hydrophile properties be sufficient to produce an emulsion when mixed with xylene in the manner previously described.

Needless to say, when the derivative is formed, such derivative, such as the kind herein described, i. e., esters derived from monocarboxy acids having less than 8 carbon atoms, may have, and in fact, invariably have, altered hydrophile character. Stated another way, it means that the hydrophobe-hydrophile balance has been changed. Needless to say, the ester, generally speaking, has less hydrophile character than the oxyalkylated resinous intermediate.

In the formation of esters the hydrophobe-hydrophile balance is affected by this factor, whether one prepares a complete ester or partial ester. In a general way, although the herein described esters are valuable for various purposes, and particularly for demulsification, even though the hydrophobe character may be increased somewhat and the hydrophile character decreased somewhat, yet when the same test is applied to derivatives as is applied to oxyalkylated resins, and when such derivatives also show at least such minimum hydrophile character, they are unquestionably most advantageous, particularly for use as demulsifiers.

It is quite likely that the esters of hydroxyacetic acid and similar acids having only three or four carbon atoms do not materially reduce the hydrophile properties. However, it is to be noted that the conversion of a terminal hydroxyl into an ester, even the ester of a low molal acid, does reduce hydrophile properties; for example, compare the water solubility of ethyl acetate on the one hand with ethyl alcohol, or acetic acid, on the other hand. This analogy is only approximate, however, because the terminal hydroxyl again is present and involves marked hydrophile property.

Thus, in the hereto appended claims, in pointing out the invention in such specific character, at least part of the claims are directed to derivatives in which the derivative meets the same final test in regard to the production of a xylene emulsion. Stated another way, the final derivative must be at least as hydrophile, or more so, than the minimum requirement for the oxyalkylated resin, as defined.

Having thus described our invention, what we claim as new and desire to secure by Letters Patent is:

1. An ester in which the acyl radical is that of an unsubstituted hydroxylated, aliphatic monocarboxy acid having at least 2 and less than 8 carbon atoms and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic, solvent-soluble, water-insoluble, phenol-aldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

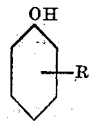

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A glycollate of certain hydrophile polyhydric synthetic products; said hydrophile synthetic products being oxyalkylation products of: (A) an alpha-beta alkylene oxide having not more than 4 carbon atoms and selected from the class consisting of ethylene oxide, propylene oxide, butylene oxide, glycide, and methylglycide; and (B) an oxyalkylation-susceptible, fusible, organic solvent-soluble, water-insoluble phenolaldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

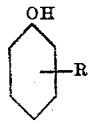

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ester as well as the oxyalkylated resin in an equal weight of xylene are sufficient to produce an emulsion when said xylene solution is shaken vigorously with one to three volumes of water.

3. A glycollate of certain hydrophile polyhydric synthetic products; said hydrophile synthetic products being oxyethylation products of: (A) ethylene oxide; and (B) an oxyethylation-susceptible, fusible, organic solvent-soluble, water-insoluble phenolaldehyde resin; said resin being derived by reaction between a difunctional monohydric phenol and an aldehyde having not over 8 carbon atoms and having one functional group reactive toward said phenol; said resin being formed in the substantial absence of phenols of functionality greater than 2; said phenol being of the formula:

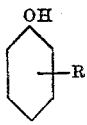

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ester as well as the oxyethylated resin in an equal weight of xylene are sufficient to produce an emulsion when said xylene solution is shaken vigorously with one to three volumes of water.

4. A glycollate of certain hydrophile polyhydric synthetic products; said hydrophile synthetic products being oxyethylation products of: (A) ethylene oxide; and (B) an oxyethylation-susceptible, fusible, oranic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than 2; said phenol being of the formula:

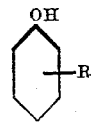

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ester as well as the oxyethylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
|---|---|---|
| 2,178,829 | Bruson et al. | Nov. 7, 1939 |
| 2,499,365 | De Groote | Mar. 7, 1950 |